US010982832B2

(12) United States Patent
Rayer

(10) Patent No.: US 10,982,832 B2
(45) Date of Patent: Apr. 20, 2021

(54) HEADLIGHT WITH CLUSTERS OF SEMICONDUCTOR LIGHT SOURCES

(71) Applicant: OSRAM GmbH, Munich (DE)

(72) Inventor: Mathieu Rayer, Augsburg (DE)

(73) Assignee: OSRAM Beteiligungsverwaltung GmbH, Grünwald (DE)

( * ) Notice: Subject to any disclaimer, the term of this patent is extended or adjusted under 35 U.S.C. 154(b) by 128 days.

(21) Appl. No.: 15/959,328

(22) Filed: Apr. 23, 2018

(65) Prior Publication Data

US 2018/0306398 A1 Oct. 25, 2018

(30) Foreign Application Priority Data

Apr. 25, 2017 (DE) .................... 10 2017 206 956.2

(51) Int. Cl.

| | |
|---|---|
| ***B60Q 1/00*** | (2006.01) |
| ***F21S 41/143*** | (2018.01) |
| ***F21S 41/255*** | (2018.01) |
| ***F21V 5/04*** | (2006.01) |
| ***F21S 41/26*** | (2018.01) |

(Continued)

(52) U.S. Cl.

CPC ............ *F21S 41/143* (2018.01); *F21S 41/25* (2018.01); *F21S 41/255* (2018.01); *F21S 41/26* (2018.01); *F21S 41/285* (2018.01); *F21S 43/14* (2018.01); *F21V 5/04* (2013.01); *F21W 2102/14* (2018.01); *F21W 2102/145* (2018.01); *F21Y 2115/10* (2016.08)

(58) Field of Classification Search

CPC ...... F21S 41/143; F21S 41/153; F21S 41/285; F21V 5/008; F21V 5/004; F21V 5/005; F21V 5/007

See application file for complete search history.

(56) References Cited

U.S. PATENT DOCUMENTS

2011/0320024 A1 12/2011 Lin et al.
2015/0078011 A1 3/2015 Sy et al.

(Continued)

FOREIGN PATENT DOCUMENTS

AT 517699 A4 4/2017
DE 102012008833 A1 11/2012

(Continued)

OTHER PUBLICATIONS

German Search Report based on application No. 10 2017 206 956.2 (12 pages) dated Mar. 7, 2018 (for reference purpose only).

*Primary Examiner* — Andrew J Coughlin

(57) ABSTRACT

A headlight includes a first LED cluster having a plurality of first LEDs arranged next to one another on a common first substrate, a second LED cluster having a plurality of second LEDs arranged next to one another on a common second substrate, and an output coupling optical unit having a plurality of optical elements, of which an optical element which comes first in a beam path of the LED clusters has, a light incidence surface which is common to the LED clusters. The LED clusters have a lateral distance from one another which is at least as great as an extent of the LED clusters in the same direction. The common light incidence surface has a locally delimited light incidence region directly in front of an associated LED cluster. The locally delimited light incidence region deviates from the basic shape of the light incidence surface.

21 Claims, 2 Drawing Sheets

(51) Int. Cl.

| | |
|---|---|
| ***F21S 43/14*** | (2018.01) |
| ***F21S 41/20*** | (2018.01) |
| ***F21S 41/25*** | (2018.01) |
| *F21Y 115/10* | (2016.01) |
| *F21W 102/14* | (2018.01) |
| *F21W 102/145* | (2018.01) |

(56) References Cited

U.S. PATENT DOCUMENTS

| | | | | |
|---|---|---|---|---|
| 2016/0368414 | A1 | 12/2016 | Son et al. | |
| 2017/0088036 | A1 | 3/2017 | Roeckl et al. | |
| 2017/0114975 | A1* | 4/2017 | Hiki | F21S 41/47 |
| 2017/0241607 | A1 | 8/2017 | Courcier | |
| 2017/0292671 | A1* | 10/2017 | Gousset-Rousseau | F21S 41/143 |
| 2019/0234572 | A1* | 8/2019 | Courcier | G03B 21/206 |

FOREIGN PATENT DOCUMENTS

| | | | |
|---|---|---|---|
| DE | 102015012568 | A1 | 3/2017 |
| EP | 2752615 | A1 | 7/2014 |

* cited by examiner

HEADLIGHT WITH CLUSTERS OF SEMICONDUCTOR LIGHT SOURCES

CROSS-REFERENCE TO RELATED APPLICATION

This application claims priority to German Patent Application Serial No. 10 2017 206 956.2, which was filed Apr. 25, 2017, and is incorporated herein by reference in its entirety.

TECHNICAL FIELD

Various embodiments relate generally to a headlight (or spotlight), having a first LED cluster having a plurality of first LEDs, which are arranged next to one another on a common first substrate, a second LED cluster having a plurality of second LEDs, which are arranged next to one another on a common second substrate, an output coupling optical unit having a plurality of optical elements, of which an optical element which comes first in a beam path of the LED clusters has, in the form of a first lens, a light incidence surface which is common to the LED clusters and has a specified basic shape. Various embodiments are applicable e.g. to vehicle headlights for front illumination.

BACKGROUND

Conventional motor vehicles use a non-dazzling high beam (known as "adaptive driving beam," ADB) to dynamically adapt a light output pattern or a light intensity distribution (also referred to as LID). To produce the ADB high beam, it is possible to use a headlight having a light source that has a group, or a cluster, of light-emitting diodes (LEDs) which are settable individually in terms of their radiation intensity.

Vehicle front headlights frequently require a plurality of (i.e. two or more) said LED clusters to produce the desired light output pattern. To save space and costs, the plurality of LED clusters use the same output coupling optical unit. However, if, in the case that a lateral distance between two LED clusters is greater than an extent of the individual LED clusters in the same direction, conventional circularly symmetric output coupling optical units are used, some—e.g. stripe-type—regions in the light output pattern are not illuminated.

In order to avoid these non-illuminated regions, conventionally separate output coupling optical units having different horizontal magnification for different LED clusters are used to cause the associated partial light output patterns to overlap.

Another possibility for avoiding the non-illuminated partial regions is, in theory, to make the distance between the LED clusters smaller then their extent. However, this is not yet possible in practice at this time.

SUMMARY

A headlight includes a first LED cluster having a plurality of first LEDs arranged next to one another on a common first substrate, a second LED cluster having a plurality of second LEDs arranged next to one another on a common second substrate, and an output coupling optical unit having a plurality of optical elements, of which an optical element which comes first in a beam path of the LED clusters has, a light incidence surface which is common to the LED clusters. The LED clusters have a lateral distance from one another which is at least as great as an extent of the LED clusters in the same direction. The common light incidence surface has a locally delimited light incidence region directly in front of an associated LED cluster. The locally delimited light incidence region deviates from the basic shape of the light incidence surface.

BRIEF DESCRIPTION OF THE DRAWINGS

The above-described properties, features and advantages of this invention, and the manner in which they are achieved, will become clearer and significantly more comprehensible in connection with the following schematic description of exemplary embodiments, which will be explained in more detail in connection with the drawings. For the sake of clarity, the same elements or elements having the same effect can be provided with the same reference signs.

DESCRIPTION

Figure 1:
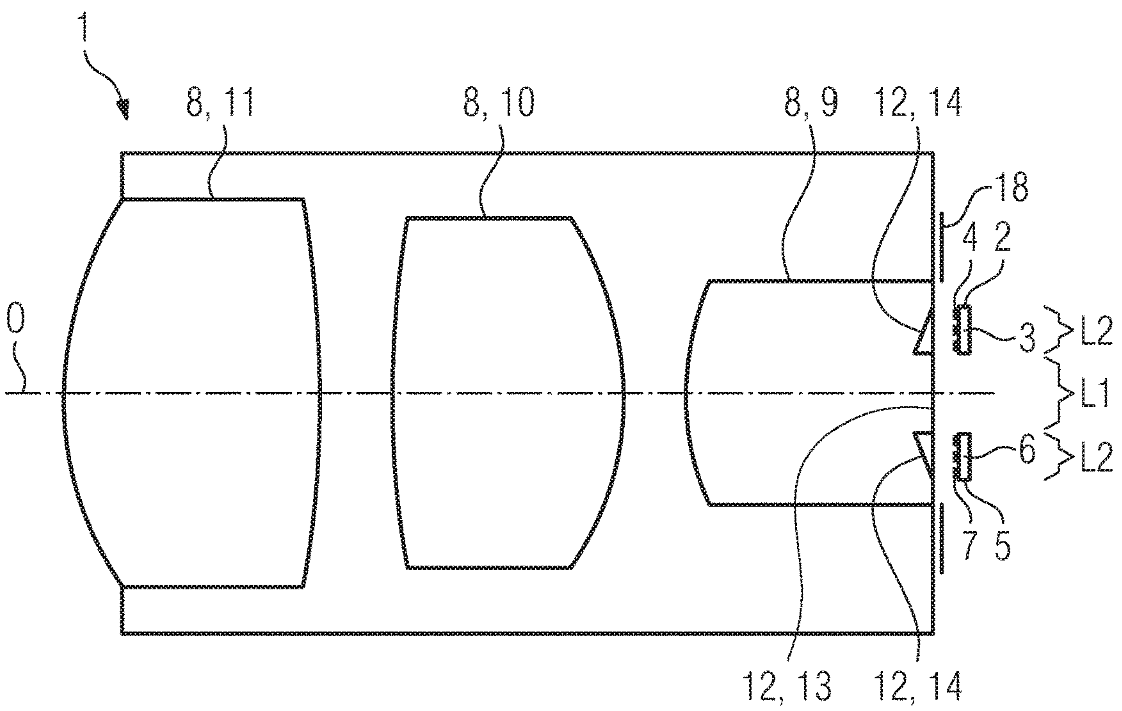
FIG. 1 shows a sectional illustration in plan view of a diagram of a headlight.

The following detailed description refers to the accompanying drawings that show, by way of illustration, specific details and embodiments in which the invention may be practiced.

Various embodiments may at least partially overcome the disadvantages of the prior art and e.g. provide an improved way of avoiding non-illuminated partial regions.

Various embodiments provide a headlight, having a first cluster having a plurality of first semiconductor light sources, which are arranged next to one another on a common first substrate, a second cluster having a plurality of second semiconductor light sources, which are arranged next to one another on a common second substrate, an output coupling optical unit having a plurality of optical elements, of which an optical element which comes first in a beam path of the clusters has, in the form of a first lens, a light incidence surface which is common to the clusters and has a specified basic shape. The clusters have a lateral distance from one another which is at least as great as an extent of at least one of the clusters in the same direction, the common light incidence surface has at least one locally delimited light incidence region directly in front of an associated cluster, and the at least one light incidence region deviates from the basic shape of the light incidence surface.

This headlight may offer the effect that it avoids the non-illuminable partial regions and in addition requires only a single output coupling optical unit that is common to the clusters, which saves space and costs. In addition, it is thus made possible for partial light output patterns that are produced by the individual clusters to have a same size in the far field in front of the headlight (which applies, for the high beam, for example from approximately 5 or 10 meters).

The headlight can be a vehicle headlight, e.g. a headlight for front illumination, e.g. for producing an adaptive light output pattern (AFS) for high beam (ADB), low beam, bending light and/or fog light. The vehicle can be a motor vehicle (e.g. an automotive vehicle such as a passenger car, truck, bus etc. or a motorcycle), a railway vehicle, a vessel (e.g. a boat or a ship) or an aircraft (e.g. a plane or a helicopter).

However, the headlight, or spotlight, can also be used for ambient lighting, exterior lighting, stage lighting etc.

In one development, the at least one semiconductor light source is at least one light-emitting diode (LED). The at least one light-emitting diode can be present in the form of at least one light-emitting diode package or in the form of at least one LED chip. A plurality of LED chips can be mounted on a common substrate. Instead of or in addition to inorganic light-emitting diodes, e.g. based on InGaN or AlInGaP, generally also organic LEDs (OLEDs, e.g. polymer OLEDs) may be used. Alternatively, the at least one semiconductor light source can have e.g. at least one diode laser.

The semiconductor light sources of the clusters can be actuable individually or in groups, e.g. can be switched on and off, e.g. can be dimmed.

The substrates of the clusters can be level substrates. The light emission regions of the semiconductor light sources of a cluster are then situated e.g. in one level plane. The substrates can be ceramic substrates, printed circuit boards etc.

The semiconductor light sources being arranged next to one another on a common substrate may e.g. include the arrangement of the semiconductor light sources on the substrate in a regular arrangement pattern, e.g. in a hexagonal or a matrix-type arrangement.

In one development, at least two clusters—e.g. all clusters—are clusters with the same embodiments, e.g. have the same arrangements of semiconductor light sources.

The output coupling optical unit can also be referred to as a projection optical unit. The plurality of optical elements of the output coupling optical unit may e.g. have a plurality of lenses. The plurality of optical elements of the output coupling optical unit can be optically connected in series. The common optical element that comes first in the beam path of the plurality of clusters is provided e.g. in the form of a lens (referred to below, without limiting the general nature, as a “first lens”). The clusters radiate the light they emit onto said first lens, which consequently has a light incidence surface that is common to the clusters.

The light incidence surface has a specified basic shape, having on the whole substantially a same shape (i.e. in particular the same with the exception of the light incidence regions which will be described in more detail further below). In one development, the basic shape is an analytically calculable basic shape at least at its portion that includes all light incidence regions, for example a plane basic shape or a concavely or convexly spherical, parabolic, hyperbolic etc. basic shape.

A lateral distance between the clusters can be understood to mean a shortest distance between light sources, or their light emission surfaces, of the two clusters perpendicular to a main output direction of the clusters. The lateral distance can also be referred to as a gap. The main output direction can be in particular a propagation direction of a light ray having a maximum radiant intensity of the light beam output by a cluster. The light beam output by the cluster may be a superposition of the individual light beams output by the light sources of the cluster. The lateral distance between clusters that are situated parallel with respect to each other or even in the same plane then corresponds to a gap width, for example when viewing the clusters from the front.

An extent of a cluster can be understood to mean e.g. its width or height of the cluster when viewing the light sources from the front.

The local light incidence region being situated directly in front of an associated cluster can mean e.g. that the—e.g. contiguous—light incidence region includes an imaginary projection of the light emission surfaces of all light sources of said cluster in the main output direction thereof.

The at least one light incidence region deviating from the basic shape of the light incidence surface may mean e.g. that the light incidence region has a surface that differs from the basic shape that is continued here in imaginary fashion.

The light incidence regions being locally delimited can mean in particular that they are separate from one another. The light incidence regions being locally delimited can also mean that they each extend not over the entire light incidence surface, thus e.g. not from one edge to the other of the light incidence surface.

In general, the headlight can also have more than two clusters (e.g. a third, fourth etc. cluster), which are used similarly to the first cluster and the second cluster. That is to say, where two clusters, or a first and a second cluster, are mentioned, this can also be understood to mean at least two clusters, or a first, a second and at least one further cluster.

In one embodiment, the at least one light incidence region has a roundish outer contour and is inclined with respect to the basic shape of the light incidence surface. This may offer the effect that the partial light output patterns of the individual clusters can overlap especially effectively at least in the far field. In addition, such a light incidence surface is easy to produce. The inclined light incidence region e.g. has the effect that the light beam of the associated cluster that is incident thereon is refracted into the first lens at a different angle than it would if the light incidence surface had its basic shape here.

The roundish outer contour can in particular be a geometrically smooth and convex outer contour. The outer contour can be a circular or oval outer contour. Alternatively, the outer contour is an outer contour in the manner of a polygonal chain.

In another embodiment, the inclinations of the light incidence regions are oriented in the same way. This may offer the effect that the position of the partial light output patterns is displaceable in a particularly simple manner in only one direction. The inclinations of the light incidence regions being oriented in the same way can mean e.g. that the inclined light incidence regions are rotated with respect to the basic shape of the light incidence surface about respective axes of rotation, and the axes of rotation are parallel with respect one another.

In a development thereof, all clusters are arranged in a same imaginary plane which is perpendicular with respect to all axes of rotation.

In yet a further embodiment, at least one light incidence region is offset with respect to an optical axis of the first lens or the output coupling optical unit. The light incidence region being offset may include that the optical axis does not intersect the light incidence region centrally, but passes through the light incidence region at a different location. The light incidence region being offset may alternatively include that the optical axis does not intersect the light incidence region. In a development, the optical axis passes through only one light incidence region, possibly even centrally, and not through all the other (one or more) light incidence regions. In another development, the optical axis does not pass through any of the light incidence regions. The light incidence regions can be arranged as a group symmetrically or asymmetrically with respect to the optical axis.

In a further embodiment, at least one light incidence region has a surface shape that is the same as the basic shape of the light incidence surface. This may make possible a generation of a light output pattern with minor jumps at the transitions between the individual partial light output patterns. A same shape can be understood to mean qualitatively a same shape which, however, does not need to have the same dimensions. This includes for example shapes which are described using the same analytical formula, but different parameter values. For example, the light incidence surface and the local light incidence regions can both have a spherical shape, but with different radii. A same shape can however also be understood to mean a quantitatively same shape in which the dimensions also match ("identical shape"). For example, in the case of an identical shape, the light incidence surface and the local light incidence regions can be formed, for example, to be spherical with the same radii or planar.

In another embodiment, at least one light incidence region has a surface shape that is different from the basic shape of the light incidence surface. This makes possible yet another variation of the partial light output patterns. For example, the light incidence surface can be planar, while at least one local light incidence region has a spherical surface shape.

In an additional embodiment, a surface of at least one light incidence region is a free-form surface. This may make possible a particularly variable adaptation of the partial light output patterns.

In an additional embodiment, all light incidence regions have a quantitatively or qualitatively same surface shape.

In yet another embodiment, all local light incidence regions lie within a projection region of a perpendicular projection starting from the associated substrate or the light sources thereof. The effect of this is that at least the portion of the light rays of the light beam output by an associated cluster that have a maximum radiant intensity is incident on the local light incidence region. This results in a large portion of the radiant power of the light that is output by the cluster being able to be incident on the local light incidence region. In a development, an outer contour of the local light incidence region corresponds to at least one outer contour of the cluster, or the light sources thereof, specifically with respect to shape and size.

In a development, a large portion of the radiant power is understood to mean at least 50% of the total radiant power, e.g. at least 60% of the total radiant power, e.g. at least 70% of the total radiant power, e.g. at least 80% of the total radiant power, e.g. at least 90% of the total radiant power, e.g. at least 95% of the total radiant power, e.g. at least 98% of the total radiant power.

In a development, the main output directions of all light sources of a cluster strike the same local light incidence region.

In an additional embodiment, the local light incidence regions lie within a light beam, which is output by the associated LED cluster, having at least a respective half maximum radiant intensity. A local light incidence region then amy include at least that partial surface of the light incidence surface that is irradiated with light from a cluster that has a radiant intensity of at least a half maximum radiant intensity of said light. Light having a lower radiant intensity can be incident outside the associated local light incidence region, which may help avoid or blur sharp boundaries between partial light output patterns. In a development, the local light incidence regions lie within a light beam, emitted by the associated LED cluster, having at least 60%, e.g. having 70%, e.g. having 80%, e.g. having 90% of the maximum radiant intensity.

In yet an additional embodiment, the LED clusters each have a plurality of LED chips, which are arranged next to one another on an associated level substrate, wherein a lateral distance between neighboring LED chips of an LED cluster is substantially smaller than the lateral distance between neighboring LED clusters. This simplifies use of a plurality of LED clusters and offers significant cost advantages. The substantially smaller distance can be a distance that is at least five times smaller than the lateral distance between neighboring LED clusters. The substantially smaller distance can be e.g. a distance that is smaller than the lateral distance between neighboring LED clusters by at least one order of magnitude, i.e. at least ten times smaller. In general, the light sources can be arranged so close together that their individual emitter surfaces are practically perceivable as a single contiguous total emitter surface.

In an embodiment, the planes of the substrates carrying the LED chips or clusters are arranged next to one another in a common plane. In a development, the clusters, or the light sources thereof, are arranged on a common, e.g. level, substrate.

FIG. 1 shows a diagram of a headlight 1 in plan view. The headlight 1 can be an adaptive headlight, e.g. for the adaptive front illumination of a motor vehicle, e.g. for producing an adaptive high beam.

The headlight 1 has a first light emitting diode (LED) cluster 2 having a plurality of first LED chips 4, which are arranged next to one another on a common first substrate 3, and a second LED cluster 5 having a plurality of second LED chips 7, which are arranged next to one another on a common second substrate 6. The planes of the substrates 3, 6 that carry the LED chips 4, 7 are arranged in a common plane next to one another. The LED chips 4, 7 are individually actuable. The LED chips 4, 7 can be arranged e.g. in the form of a matrix, for example in a 3×5 pattern, a 5×10 pattern etc. The first LED cluster 2 and the second LED cluster 5 can have the same construction.

Arranged downstream of the two LED clusters 2, 5 is a common output coupling optical unit 8 having a plurality of optical elements 9 to 11. A first optical element thereof is present in the form of a first lens 9, which has a light incidence surface 12 that is common to the two LED clusters 2, 5. The common light incidence surface 12 has a specified level or planar basic shape 13. The output coupling optical unit 8 has an optical axis O. The two other lenses 10 and 11 are optically connected in series with the first lens 9.

The LED clusters 2, 5 have a lateral distance L1 from one another which is at least as great as an extent L2 of at least one of the LED clusters 2, 5 in the same direction (here: perpendicularly to the optical axis O). The common light incidence surface 12 also has locally delimited ("local") light incidence regions 14, which are located directly in front of a respectively associated LED cluster 2 or 5.

A lateral distance between neighboring LED chips 4, 7 of an LED cluster is substantially smaller than the lateral distance L1 between neighboring LED clusters 2, 5, e.g. smaller by at least one order of magnitude. In various embodiments, the LED chips 4, 7 can be arranged so close together that their individual emitter surfaces are practically perceivable as a single contiguous total emitter surface.

The local light incidence regions 14 deviate from the planar basic shape 13 of the light incidence surface 12 in that they are inclined with respect thereto. The inclinations of the local light incidence regions 14 are here oriented in the same way in the sense that the level local light incidence regions 14 can each be oriented out from the planar basic shape 13 by an imaginary rotation about an axis of rotation, and said imaginary axes of rotation are parallel with respect to one another. Here, both imaginary axes of rotation would be perpendicular with respect to the image plane. The deviation from the basic shape of the light incidence surface 12 consequently only occurs here in a horizontal plane or direction.

In addition to the light incidence surface 12, the light incidence regions 14 may undergo an imaginary displacement along the optical axis O.

The local light incidence regions 14 likewise have a plane basic shape. The local light incidence regions 14 can be formed in the first lens 9 such that the light incidence surface 12 at those locations has in each case a cylindrical cutout having a plane and oblique base as the local light incidence region 14. The local light incidence regions 14 therefore have a roundish (e.g. circular) outer contour as viewed along the optical axis O.

The local light incidence regions 14 lie e.g. within a projection region of a perpendicular projection that proceeds from the LED chips 4, 7 of the respectively associated substrate 3, 6 (i.e. a projection that is formed along the optical axis O). In other words, in the case of a perpendicular projection along the optical axis O, the LED chips 4, 7 of a substrate 3, 6 lie within the associated local light incidence region 14.

The local light incidence regions 14 furthermore lie within a light beam having at least a respective half maximum radiant intensity, which is output by the respectively associated LED cluster 2, 5 or the LED chips 4, 7 thereof together. This can be set e.g. by setting a sufficiently small distance of the LED clusters 2, 5 from the local light incidence regions 14.

Moreover, the headlight 1 has a screen 18 or another light absorption means to absorb light output by the LED chips 4, 7 which would not strike the light incidence surface 12. Such a screen 18 can be generally present.

Figure 2:
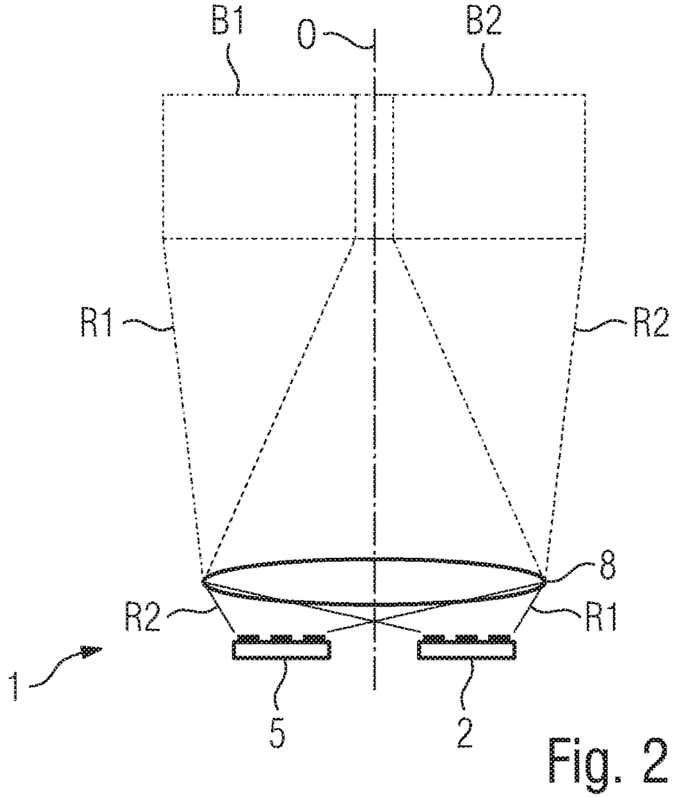
FIG. 2 shows a plan view of a diagram of a beam path of the headlight from FIG. 1.

FIG. 2 shows a plan view of a highly simplified diagram of a beam path of the headlight 1. The LED clusters 2, 5 emit respective light beams R1 and R2, which partially overlap in the horizontal direction at the latest after the output coupling optical unit 8 due to the local light incidence regions 14. This is here indicated schematically by way of the light beams R1 and R2 producing respective images B1 and B2, which partially overlap, in a common image plane. The overlap has the effect that stripe-type regions in the total light output pattern B1+B2 which are not illuminated are avoided.

Figure 3:
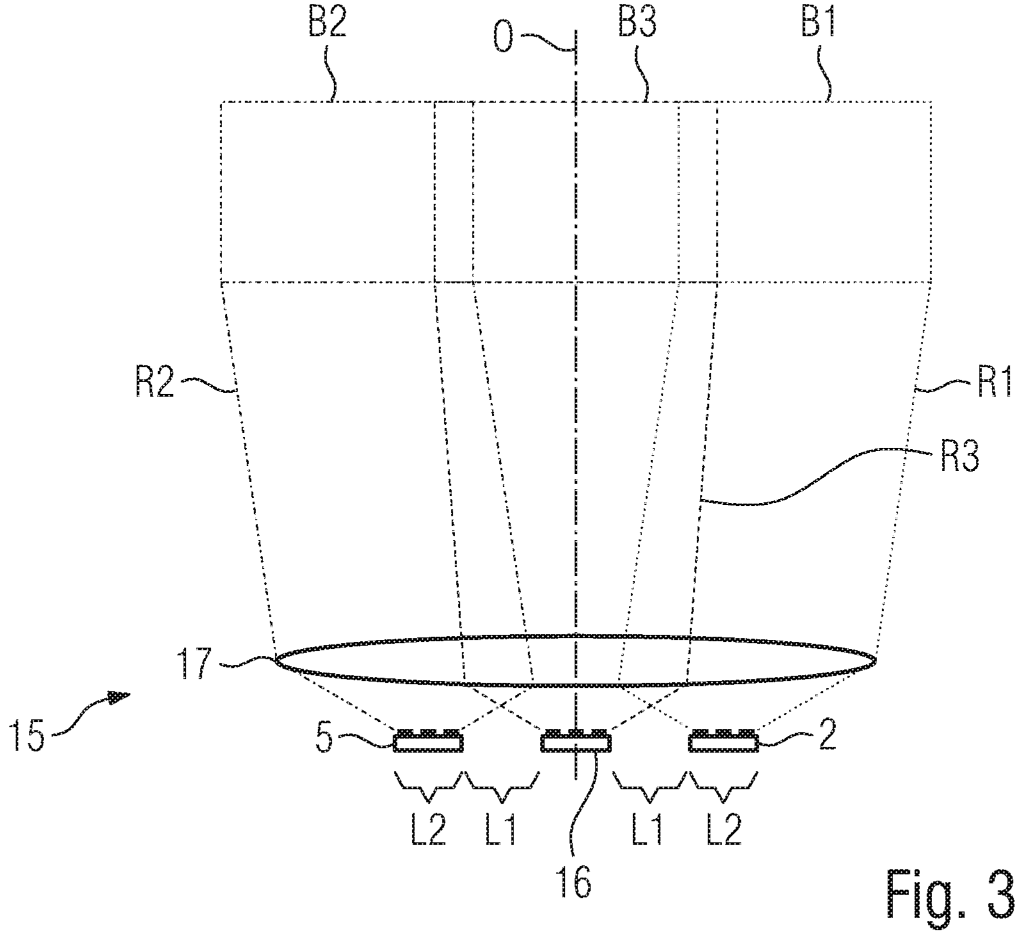
FIG. 3 shows a plan view of a diagram of a beam path of a further headlight.

FIG. 3 shows a plan view of a highly simplified diagram of a beam path of a further headlight 15. The headlight 15 here has three, e.g. identical, LED clusters 2, 5 and 16.

The LED cluster 16, which has been added as compared to FIG. 2, is here arranged centrally with respect to an indicated output coupling optical unit 17. The output coupling optical unit 17 likewise has an optical axis O.

The LED clusters 2, 5 and 16 are arranged in a row (here extending horizontally) perpendicularly to the optical axis O. A distance L1 between two LED clusters 2, 16 and 5, 16 perpendicular with respect to the optical axis O is smaller than the extent L2 of the LED clusters 2, 5 and 16 in that direction.

The output coupling optical unit 17 can also have a first lens (not shown) having a light incident surface (not shown) which is common to the LED clusters 2, 5, 16. The common light incidence surface can have for each of the LED clusters 2, 5, 16 a local light incidence region (not shown) that deviates from the basic shape. Alternatively, the common light incidence surface can have a local light incidence region which differs from the basic shape only for some of the LED clusters 2, 5, 16, for example only for the LED clusters 2 and 5, which are eccentric with respect to the optical axis O.

The LED clusters 2, 5 and 16 emit respective light beams R1, R2 and R3, which partially overlap at the latest after the output coupling optical unit 17 due to the local light incidence regions. This is indicated schematically by way of the light beams R1, R2 and R3 producing respective images B1, B2 and B3, which partially overlap, in a common image plane. The overlap has the effect that stripe-type regions in the total light output pattern B1+B2+B3 which are not illuminated are avoided.

The headlight 15 can also have a screen or the like (not shown).

Although various embodiments have been further illustrated and described in detail by way of the exemplary embodiments shown, the embodiments are not limited thereto, and other variations can be derived herefrom by a person skilled in the art without departing from the scope of the invention.

For example, at least one local light incidence region can have a surface shape that differs from the basic shape of the light incidence surface. For example, a surface of at least one light incident region can be a free-form surface.

The local light incidence regions can in principle be arranged symmetrically or asymmetrically with respect to the optical axis O, specifically with respect to a radial distance from the optical axis O and/or with respect to an angular distribution around the optical axis O. A local light incidence region can also be arranged so far centrally that the optical axis O passes through it.

Generally, "a," "an" etc. can be understood to mean a singular or a plural, in particular in the sense of "at least one" or "one or more" etc., unless this is explicitly ruled out, e.g. by the expression "exactly one" etc.

A mention of a number may also include both the stated number and a customary tolerance range, unless this is explicitly ruled out.

| List of Reference Signs: | |
|---|---|
| Headlight | 1 |
| First LED cluster | 2 |
| First substrate | 3 |
| First LED chips | 4 |
| Second LED cluster | 5 |
| Second substrate | 6 |
| Second LED chips | 7 |
| Output coupling optical unit | 8 |
| First lens | 9 |
| Lens | 10 |
| Lens | 11 |
| Light incidence surface | 12 |
| Basic shape | 13 |
| Local light incidence region | 14 |
| Headlight | 15 |
| LED cluster | 16 |
| Output coupling optical unit | 17 |
| Screen | 18 |
| Image | B1 |
| Image | B2 |
| Image | B3 |
| Lateral distance | L1 |
| Extent | L2 |
| Optical axis | O |
| Light beam | R1 |
| Light beam | R2 |
| Light beam | R3 |

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A headlight, comprising:

a first light emitting diode cluster having a plurality of first light emitting diodes, which are arranged next to one another on a common first substrate;

a second light emitting diode cluster having a plurality of second light emitting diodes, which are arranged next to one another on a common second substrate;

an output coupling optical unit having a plurality of optical elements, of which an optical element which comes first in a beam path of the light emitting diode clusters has, in the form of a first lens, a light incidence surface which is common to the light emitting diode clusters and has a specified basic shape;

wherein the light emitting diode clusters have a lateral distance from one another which is at least as great as an entire extent of at least one of the light emitting diode clusters in the same direction;

wherein the common light incidence surface has at least one locally delimited light incidence region directly in front of an associated light emitting diode cluster; and wherein the at least one locally delimited light incidence region deviates from the basic shape of the light incidence surface.

2. The headlight of claim 1, wherein the at least one light incidence region has a roundish outer contour and is inclined with respect to the basic shape of the light incidence surface.

3. The headlight of claim 2, wherein the inclinations of the light incidence regions are oriented in the same way.

4. The headlight of claim 2, wherein at least one light incidence region is offset with respect to an optical axis of the first lens or the output coupling optical unit.

5. The headlight of claim 1, wherein at least one light incidence region has a surface shape that is the same as the basic shape of the light incidence surface.

6. The headlight of claim 1, wherein at least one light incidence region has a surface shape that differs from the basic shape of the light incidence surface.

7. The headlight of claim 6, wherein a surface of at least one light incidence region is a free-form surface.

8. The headlight of claim 1, wherein the light incidence regions lie within a projection region of a perpendicular projection starting from the associated substrate.

9. The headlight of claim 1, wherein the light incidence regions lie within a light beam, emitted by the associated light emitting diode cluster, having at least a respective half maximum radiant intensity.

10. The headlight of claim 1, wherein the light emitting diode clusters each have a plurality of light emitting diode chips, which are arranged next to one another on an associated level substrate;

wherein a lateral distance between neighboring light emitting diode chips of a light emitting diode cluster is substantially smaller than the lateral distance between neighboring light emitting diode clusters.

11. The headlight of claim 10, wherein the planes of the substrates that carry the light emitting diode chips are arranged in a common plane next to one another.

12. The headlight of claim 1, wherein the headlight is a vehicle headlight.

13. The headlight of claim 12, wherein the vehicle headlight is a headlight for front illumination.

14. The headlight of claim 1, wherein the lateral distance (L1) of the light emitting diode clusters (2, 5) from one another is greater than the entire extent (L2) of the at least one of the first and second light emitting diode clusters (2; 5).

15. The headlight of claim 14, wherein the lateral distance (L1) of the light emitting diode clusters (2, 5) from one another is greater than the entire extent of each of the respective first and second light emitting diode clusters (2, 5).

16. The headlight of claim 15, wherein the basic shape of the light incidence surface (12) of the first lens (8, 9) is convexly curved towards the first and second light emitting diode clusters (2, 5).

17. The headlight of claim 14, wherein the basic shape of the light incidence surface (12) of the first lens (8, 9) is non-planar.

18. The headlight of claim 14, wherein the basic shape of the light incidence surface (12) of the first lens (8, 9) is convexly curved towards the first and second light emitting diode clusters (2, 5).

19. The headlight of claim 1, wherein the basic shape of the light incidence surface (12) of the first lens (8, 9) is non-planar.

20. The headlight of claim 1, wherein the basic shape of the light incidence surface (12) of the first lens (8, 9) is convexly curved towards the first and second light emitting diode clusters (2, 5).

21. The headlight of claim 1, wherein said lateral distance is viewed on an upstream side or a light-incident side of said light incidence surface.

* * * * *